UNITED STATES PATENT OFFICE.

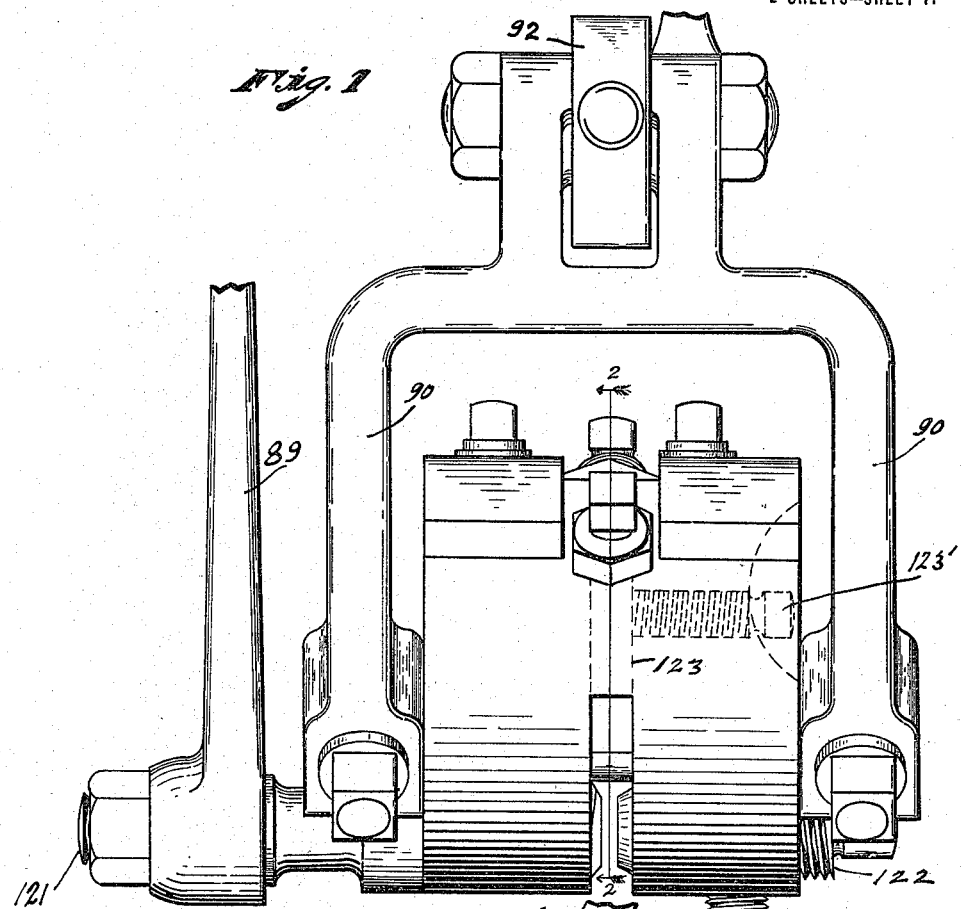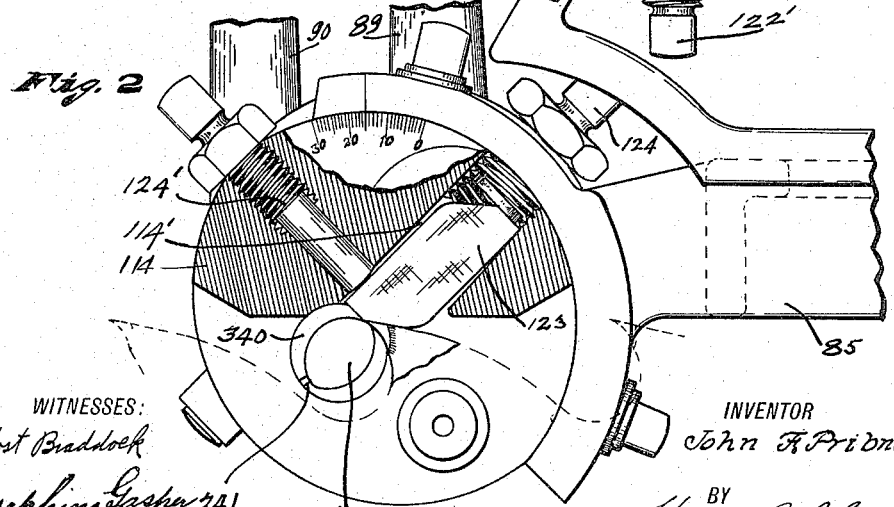

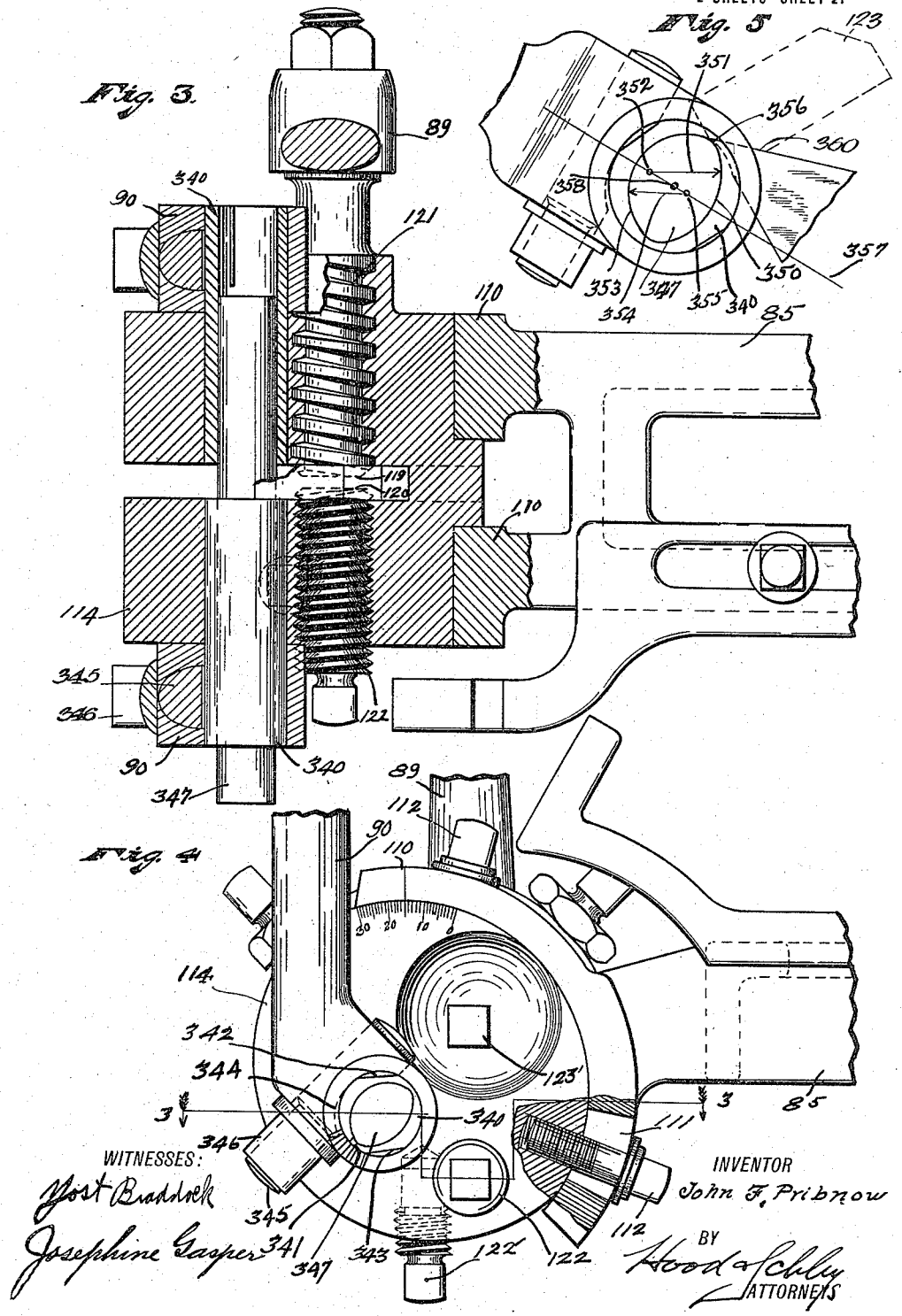

JOHN F. PRIBNOW, OF MELLIN, WISCONSIN.

SAW-SWAGE.

1,176,985.    Specification of Letters Patent.    Patented Mar. 28, 1916.

Application filed June 4, 1914, Serial No. 842,878.    Renewed October 27, 1915.    Serial No. 58,298.

*To all whom it may concern:*

Be it known that I, JOHN F. PRIBNOW, a citizen of the United States, residing at Mellin, in the county of Ashland and State of Wisconsin, have invented a new and useful Saw-Swage, of which the following is a specification.

My invention relates to swaging devices for swaging the points of saw teeth, and is particularly designed for use as the swaging device in the combined saw swaging, shaping, and grinding machine set forth in my co-pending application Ser. No. 842,876 of even filing date herewith.

It is my object in this present invention to provide a swaging device of which the anvil is tiltable in its support to vary the shape of the saw tooth on both face and back, in which the die may be made use of throughout its entire length without danger of breakage or distortion and with the provision of clearance from such parts of the saw tooth face as have been operated on, in which the die has two swaging surfaces of different curvature, either of which may be rendered effective, and in which the rise and fall of the swaging device when passing from one tooth to the next is a minimum. In attaining this object I mount the anvil in a hole larger than the anvil itself and provide an adjusting screw for tilting the anvil in its hole so that its working face takes different positions, according to the shape of tooth desired; and I also provide a die which is of uniform cross section throughout its length and is formed of two main surfaces which are parts of cylinders of different diameters and different axes, such parts of cylinders being connected by smaller curved portions, and mount this die for rotation about an axis which is non-coincident with the axes of said cylindrical surfaces. This mounting is by placing the parts of the die on the two sides of the operative portion thereof in two bushings which are spaced apart to receive the saw between them, the die extending across this space and being adjustable lengthwise in the bushings so that different parts of its surfaces may be brought into use as desired, and connect both of these bushings to an operating arm so that they are both operated thereby, the connection between the bushings and the operating arm being such that the bushings may be turned to bring into play either swaging surface of the die.

The accompanying drawings illustrate my invention.

In these drawings, Figure 1 is an end view of a swaging device embodying my invention; Fig. 2 is a sectional view substantially on the line 2—2 of Fig. 1; Fig. 3 is a sectional view substantially on the line 3—3 of Fig. 4; Fig. 4 is a side elevation; and Fig. 5 is a view on a somewhat larger scale showing the derivation of the die shape.

The swaging device which I have shown is carried by the arm 85 (which corresponds to the similarly numbered arm in my aforesaid co-pending application). This arm terminates at its free end in a pair of arc-shaped members 110 which have slots 111 through which bolts 112 extend for adjustably holding in place the cylindrical ends of a swage block 114, which has an enlarged middle part lying between the two arc-shaped members 110 to prevent axial movement of the swage block. The swage block 114 is cut away at its lower side, as is clear from Fig. 2, to provide a slot into which the saw may project. Two clamping members 119 and 120 project into this slot from opposite sides in position to grasp the saw substantially at the base of the tooth which is being swaged. The clamping member 119 is pushed inward by a screw 121 to which a clamping arm 89 is fixed, so that said clamping member is clamped and released by the operation of said arm, and the clamping member 120 is adjustably pushed inward by an adjusting screw 122. The clamping members are shown as being merely the integral ends of the screws 121 and 122, though this is not necessarily so. A clamping screw 122' may be provided for clamping the adjusting screw 122 in adjusted position.

The swage block 114 is provided with an oblique bore 114' to receive a swage anvil 123, which is smaller than such bore and is adjustably fed downward by a screw 124 which forms an abutment against which the upper end of the swage anvil bears. The hole for the screw 124 is sufficiently large to permit the anvil to be inserted and withdrawn therethrough. When properly adjusted, the swage anvil is clamped in adjusted position by a clamping screw 123', the head of which is shown as counter-sunk in the front face of the swage block 114 to allow a clear path for an operating arm 90, of which more will be said hereafter. In addition to the longitudinal adjustment screw 124, there is a single adjusting screw 124' which projects obliquely downward from the left through the swage block 114 against the upper long face of the swage anvil 123 to tilt the latter downward or allow it to be pushed upward about its upper right hand corner, near the screw 124, at which corner the anvil bears against the inside of the bore 114'. This screw 124' provides for the adjustment of the shape of the saw tooth point, and by itself completely controls the tilting of the anvil.

Mounted in the swage block 114 at right angles to the plane of the saw are two bushings 340, which project inward from the outer surfaces of the swage block to the slot provided for the saw, being limited in their inward movement by engagement with the sides of the anvil 123, as is clear from Fig. 2. These bushings project outward beyond the swage block 114, to receive the lower ends of the bifurcated arm 90, which is connected by a link 92 to suitable operating mechanism (described in my aforesaid copending application). Each bushing 340 is split at 341, and is cylindrical exteriorly except for the two flattened places 342 and 343, either of which may coöperate with an inclined flat surface at one side of the notch 344 in a clamping screw 345 which extends through each bifurcation of the arm 90 and is provided with a nut 346 whereby it may be tightened to force the flat surface of the notch 344 against either of the flattened surfaces 342 or 343 to compress the bushing 340 as allowed by the split 341. The bushings 340 are properly shaped interiorly to receive the swage die 347, said die fitting slidably within the bushings when the clamping nut 346 is loosened, and the bushings at the same time being rotatable in the arm 90, and the die being clamped in the bushings and the bushings locked in the proper position in the arm 90 when the clamping nut 346 is tightened with either of the flattened surfaces 342 or 343 in engagement with the flattened surface of the notch 344.

The die 347 is a straight bar of uniform cross section throughout, such cross section comprising a segment of a cylindrical surface 350 having a radius 351 about an axis 352 and a segment of a cylinder 353 having a radius 354 about an axis 355, the radius 354 being smaller than the radius 351. The two cylinders 350 and 353 intersect, but the segments thereof forming the surfaces of the die do not extend quite to the points of intersection but instead are connected by smaller curved surfaces 356 which are conveniently cylindrical surfaces having much smaller radii than either of the radii 351 or 354. The inside surfaces of the bushings 340 are shaped to correspond with the die 347, and the axes 352 and 355 are so located that the plane 357 joining them intersects the cylindrical segments 350 and 353 at equal distances on opposite sides of the axis 358 of the bushings 340, such axis 358 being nearer each of said points of intersection than is the axis of the corresponding cylindrical surface.

In operation, the arm 85 is reciprocated so as to cause the swaging device to operate successively on different teeth of the saw, which is indicated in dotted lines in Fig. 2. As the arm 85 moves to the left (Figs. 2 and 4) the swaging device rides up over the back of a saw tooth and drops in front of it, the saw remaining stationary. As the arm 85 is moved to the right it moves the saw along with it and during this movement of the swaging device and saw together the swaging takes place. First the arm 89 is operated to force the clamping member 119 toward the clamping member 120 to grasp the base of the saw tooth being operated on. Then the bifurcated arm 90 is turned to rotate the bushings 340 in a counter-clockwise direction, (Figs. 2 and 4) to cause one of the swaging surfaces, comprising adjacent parts of the surfaces 350 and 356 or adjacent parts of the surfaces 353 and 356 (according to the position of the die), to swing upward against the face of the saw tooth being acted on to compress the metal of such saw tooth between such surfaces 350 and 356 (or 353 and 356) and the working surface 360 of the anvil 123 to cause the saw tooth to spread as required. The fact that the radius of the cylindrical segment 350 or 353 is greater than the distance of the axis 358 from the point at which the plane 357 intersects such surface causes the die 347 during this operation to run clear of such portion of the saw tooth point as has been swaged, thereby facilitating the swaging operation and preventing it from decreasing as the extreme point of the saw tooth is approached. At the end of the movement of the arm 85 to the right the clamping arm 89 is moved to release the saw from between the clamping members 119 and 120, and the arm 90 is moved to rotate the bushings 340 and the die 347 in a clockwise direction, and the arm 85 starts on the next movement to the left to engage the next saw tooth. As the swaging device rides over the saw teeth, it rises and falls only the minimum amount required by the actual thickness of the die 347 itself. If it is desired to change the shape of the saw tooth, the screw 124' is adjusted to tilt the anvil 123 as required, to produce either a blunter tooth or a sharper tooth, this movement of the anvil changing not only the slope of the back of the tooth, but also the shape which the die 347 gives to the face of the tooth. When one part of the swaging surface of the die is battered or worn off for any reason, the clamping nuts 346 are loosened and the die is slid lengthwise in the bushings 340 in either direction to a fresh place on the swaging surface, whereupon the nuts 346 are re-tightened and the swaging goes on as before. Practically the full length of the swaging surfaces may be used, as because of the bifurcation of the arm 90 and the separate operation of the two bushings 340 no force is required to be transmitted from the bushing on one side of the saw slot to the bushing on the other side thereof, as would be required if the arm 90 acted on but one of such bushings. When one swaging surface, formed by adjacent surfaces 350 and 356 or 353 and 356, is battered or worn off throughout its length, the die may be turned end for end in the bushings and a fresh swaging surface of similar form thus presented to the work. So also either of the cylindrical surfaces 350 or 353 may be brought under the saw tooth, by loosening the nuts 346 and turning the two bushings and die together to bring either of the flattened surfaces 342 or 343 into coöperating relationship with the flattened surface on the notch 344, these flattened surfaces 342 and 343 bearing the same angular relationship to the two cylindrical surfaces 356 respectively.

I claim as my invention:

1. A saw swaging device, comprising a swage block slotted to receive a saw, said swage block being provided with a hole for the swage anvil, said hole being in the plane of the saw slot and extending obliquely to the line of saw teeth, a swage anvil mounted in said hole and more narrow than said hole in the plane of the saw slot, said anvil having a working face at an oblique angle to its length, means for adjusting said anvil along said hole, a single screw for tilting said anvil to different angular positions in said hole, a rotatable die extending across the slot for the saw and coöperating with the working face of said anvil, and an arm carrying said swage block and in which said swage block is adjustably mounted.

2. A saw swaging device, comprising a swage block slotted to receive a saw, said swage block being provided with a hole for the swage anvil, said hole being in the plane of the saw slot and extending obliquely to the line of saw teeth, a swage anvil mounted in said hole and more narrow than said hole in the plane of the saw slot, said anvil having a working face at an oblique angle to its length, a single screw for tilting said anvil to different angular positions in said hole, a rotatable die extending across the slot for the saw and coöperating with the working face of said anvil, and an arm carrying said swage block and in which said swage block is adjustably mounted.

3. A saw swaging device, comprising a swage block slotted to receive a saw, said swage block being provided with a hole for the swage anvil, said hole being in the plane of the saw slot and extending obliquely to the line of saw teeth, a swage anvil mounted in said hole and more narrow than said hole in the plane of the saw slot, said anvil having a working face at an oblique angle to its length, means for adjusting said anvil along said hole, a single screw for tilting said anvil to different angular positions in said hole, and a rotatable die extending across the slot for the saw and coöperating with the working face of said anvil.

4. A saw swaging device, comprising a swage block slotted to receive a saw, said swage block being provided with a hole for the swage anvil, said hole being in the plane of the saw slot and extending obliquely to the line of saw teeth, a swage anvil mounted in said hole and more narrow than said hole in the plane of the saw slot, said anvil having a working face at an oblique angle to its length, a single screw for tilting said anvil to different angular positions in said hole, and a rotatable die extending across the slot for the saw and coöperating with the working face of said anvil.

5. In a saw swaging device, the combination of a swage block slotted to receive a saw and provided with an oblique hole in the plane of said slot, a swage anvil in said hole and having a swaging surface oblique to its length, said anvil being more narrow than the hole in the plane of the saw slot so that it can be tilted to different positions therein, a screw for adjusting said swage anvil longitudinally in said hole, and a screw bearing against said swage anvil in opposition to the action of the saw thereon for tilting the anvil to different angular positions in its hole, and a rotatable die extending across the slot for the saw and coöperating with the swaging surface of said anvil.

6. In a saw swaging device, the combination of a swage block slotted to receive a saw and provided with an oblique hole in the plane of said slot, a swage anvil in said hole and having a swaging surface oblique to its length, said anvil being more narrow than the hole in the plane of the saw slot so that it can be tilted to different positions therein, and a screw for bearing against said swage anvil in opposition to the action of the saw thereon for tilting the anvil to different angular positions in its hole, and a rotatable die extending across the slot for the saw and coöperating with the swaging surface of said anvil.

7. A saw swaging device, comprising a swage block slotted to receive a saw, a pair of alined bushings rotatably mounted in said swage block on opposite sides of said slot, a die mounted in said bushings and extending across said slot, said die being of uniform cross section throughout its length and adjustable longitudinally in said bushings to bring different portions of its length in said slot, a bifurcated operating arm the two prongs of which are connected to said two bushings to operate them, and an anvil coöperating with said die.

8. A saw swaging device, comprising a swage block slotted to receive a saw, a pair of alined bushings rotatably mounted in said swage block on opposite sides of said slot, a die mounted in said bushings and extending across said slot, a bifurcated operating arm the two prongs of which are connected to said two bushings to operate them, and an anvil coöperating with said die.

9. A saw swaging device, comprising the combination of a swage block slotted to receive a saw, a pair of alined bushings rotatably mounted in said swage block on opposite sides of said slot, a die mounted in said bushings and extending across said slot, said die being adjustable lengthwise in said bushings to bring different parts of its length in said slot and having a longitudinal working surface flanked circumferentially by a portion lying within the cylinder generated by the movement of such working portion as it rotates about the axis of the bushings, means for rotating the two bushings together, and an anvil coöperating with said die.

10. A saw swaging device, comprising the combination of a swage block slotted to receive a saw, a pair of alined bushings rotatably mounted in said swage block on opposite sides of said slot, a die mounted in said bushings and extending across said slot, said die having a longitudinal working surface flanked circumferentially by a portion lying within the cylinder generated by the movement of such working portion as it rotates about the axis of the bushings, means for rotating the two bushings together, and an anvil coöperating with said die.

11. A saw swaging device, comprising the combination of a swage block slotted to receive a saw, a pair of alined bushings rotatably mounted in said swage block on opposite sides of said slot, a die mounted in said bushings and extending across said slot, said die being adjustable lengthwise in said bushings to bring different parts of its length in said slot and having a longitudinal working surface flanked circumferentially by portions which on the two sides of such working surface lie with and depart with different degrees of abruptness from the cylinder generated by the movement of such working portion as it rotates about the axis of the bushings, means for rotating the two bushings together, and an anvil coöperating with said die.

12. A saw swaging device, comprising the combination of a swage block slotted to receive a saw, a pair of alined bushings rotatably mounted in said swage block on opposite sides of said slot, a die mounted in said bushings and extending across said slot, said die having a longitudinal working surface flanked circumferentially by portions which on the two sides of such working surface lie with and depart with different degrees of abruptness from the cylinder generated by the movement of such working portion as it rotates about the axis of the bushings, means for rotating the two bushings together, and an anvil coöperating with said die.

13. In a saw swaging device, the combination of a swage block slotted to receive a saw, two alined bushings rotatably mounted in said swage block on opposite sides of said slot, said bushings being split, a die mounted in said bushings and extending across said slot and composed of two main cylindrical segments having different radii, a bifurcated operating arm the two prongs of which are connected to the two bushings respectively, and means for clamping said bushings in different positions in the arms and for tightening the bushings on the die.

14. In a saw swaging device, the combination of a swage block slotted to receive a saw, two alined bushings rotatably mounted in said swage block on opposite sides of said slot, said bushings being split, a die mounted in said bushings and extending across said slot and composed of two main cylindrical segments having different radii both greater than their minimum distances from the axis of rotation of the bushings, a bifurcated operating arm the two prongs of which are connected to the two bushings respectively, and means for clamping said bushings in different positions in the arms and for tightening the bushings on the die.

15. In a saw swaging device, the combination of a swage block slotted to receive a saw, two alined bushings rotatably mounted in said swage block on opposite sides of said slot, said bushings being split, a die mounted in said bushings and extending across said slot and composed of two main cylindrical segments having different radii, said main surfaces being connected by smaller curved surfaces at the places where the two cylinders would intersect, a bifurcated operating arm the two prongs of which are connected to the two bushings respectively, and means for clamping said bushings in different positions in the arms and for tightening the bushings on the die.

16. In a saw swaging device, a die which is of uniform cross section throughout its length and is composed of two main cylindrical segments of different curvatures, and with different axes, said two segments being connected by two smaller curved surfaces, and a rotatable mounting for said die for causing it to rotate about an axis non-coincident with the axis of either of said segments, the minimum distance of said axis of rotation from each segment being less than the radius of said segment.

17. In a saw swaging device, a die which is of uniform cross section throughout its length and is composed of two main cylindrical segments with different axes, said two segments being connected by two smaller curved surfaces, and a rotatable mounting for said die for causing it to rotate about an axis non-coincident with the axis of either of said segments, the minimum distance of said axis of rotation from each segment being less than the radius of said segment.

18. In a saw swaging device, a die which is of uniform cross section throughout its length and is composed of two main cylindrical segments of different curvatures, and with different axes, and a rotatable mounting for said die for causing it to rotate about an axis non-coincident with the axis of either of said segments, the minimum distance of said axis of rotation from each segment being less than the radius of said segment.

19. In a saw swaging device, a die which is of uniform cross section throughout its length and is composed of two main cylindrical segments with different axes, and a rotatable mounting for said die for causing it to rotate about an axis non-coincident with the axis of either of said segments, the minimum distance of said axis of rotation from each segment being less than the radius of said segment.

20. A saw swaging device, comprising a swage block slotted to receive a saw, said swage block being provided with a hole for the swage anvil, said hole being in the plane of the saw slot and extending obliquely to the line of the saw teeth to the outer surface of the swage block, a swage anvil mounted in said hole and more narrow than the hole in the plane of the saw slot so that it can be tilted therein in the plane of the saw and as small as the hole in any direction so that it can be removed from the outer end thereof, said anvil having a working face at an oblique angle to its length, a screw in the outer end of said hole for adjusting the anvil along said hole, means for tilting said anvil to different angular positions in said hole, and a rotatable die extending across the slot for the saw and coöperating with the working face of said anvil.

21. A saw swaging device, comprising a swage block slotted to receive a saw, said swage block being provided with a hole for the swage anvil, said hole being in the plane of the saw slot and extending obliquely to the line of the saw teeth to the outer surface of the swage block, a swage anvil mounted in said hole and more narrow than the hole in the plane of the saw slot so that it can be tilted therein in the plane of the saw and as small as the hole in any direction so that it can be removed from the outer end thereof, said anvil having a working face at an oblique angle to its length, a screw in the outer end of said hole for adjusting the anvil along said hole, a rotatable die extending across the slot for the saw and coöperating with the working face of said anvil, said die tending to tilt said anvil laterally in its hole, and a single screw projecting laterally into said hole and bearing against said anvil to oppose such tilting and to adjust the tilting of the anvil in the other direction.

In witness whereof, I have hereunto set my hand at Indianapolis, Indiana, this twenty-ninth day of May, A. D. one thousand nine hundred and fourteen.

JOHN F. PRIBNOW.

Witnesses:
JOSEPHINE GASPER,
G. B. SCHLEY.